July 30, 1968    R. KOEHLER    3,395,244
STRAIN RELIEF FOR ELECTRIC CORDS
Filed March 14, 1967    3 Sheets-Sheet 1

INVENTOR.
RUDOLPH KOEHLER
BY Leon Arthurs
Agent.

July 30, 1968  R. KOEHLER  3,395,244
STRAIN RELIEF FOR ELECTRIC CORDS
Filed March 14, 1967  3 Sheets-Sheet 2
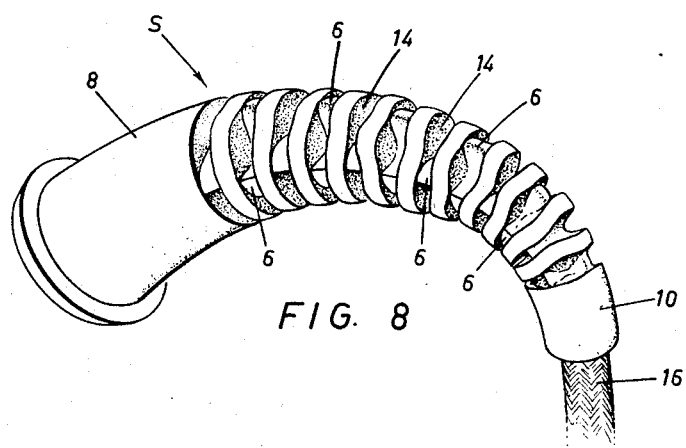
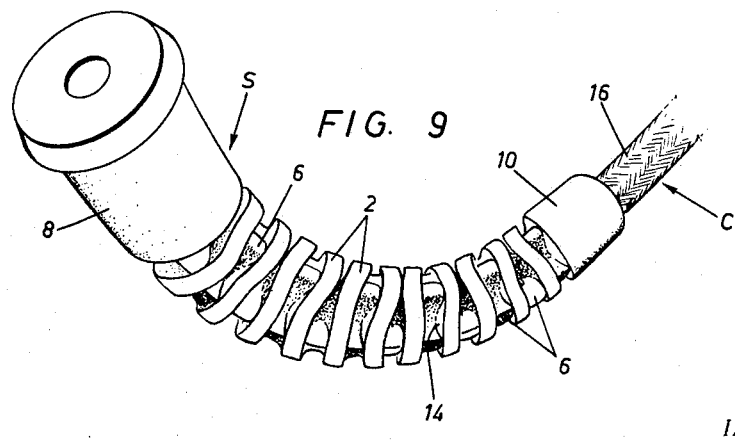
INVENTOR.
RUDOLPH KOEHLER
BY *Leon Arthurs*
Agent.

July 30, 1968  R. KOEHLER  3,395,244

STRAIN RELIEF FOR ELECTRIC CORDS

Filed March 14, 1967  3 Sheets-Sheet 3

INVENTOR.
R. KOEHLER

BY *Leon Arthurs*

Attorney

United States Patent Office 3,395,244
Patented July 30, 1968

3,395,244
STRAIN RELIEF FOR ELECTRIC CORDS
Rudolph Koehler, 46 Viamede Crescent,
Willowdale, Ontario, Canada
Continuation-in-part of application Ser. No. 429,280,
Feb. 1, 1965. This application Mar. 14, 1967, Ser.
No. 642,615
8 Claims. (Cl. 174—135)

ABSTRACT OF THE DISCLOSURE

A strain relief comprising elastomeric washers of progressively decreasing diameter assembled in coaxial relation to form a tight sleeve for an electric cord; said washers being interconnected, centrally thickened and uniformly spaced apart.

---

The present invention is a continuation-in-part of my application S.N. 429,280 filed Feb. 1, 1965 now abandoned.

The present invention relates to sleeve-like strain reliefs for surrounding and supporting electric cords to control the bending thereof at those regions where they are subjected to sharp bending strains. A strain relief is commonly applied to a cord adjacent its point of connection to an appliance in order to minimize the effects of bending stresses with consequent fatigue and breaking of the cord.

A strain relief as herein visualized is a tubular device or sleeve which is normally anchored by one of its ends to the aforesaid appliance; the other end thereof being free. The electric cord enters the strain relief at its free end and emerges from the anchored end for connection to the appliance in a known manner.

Under certain well-known conditions, the cord may be pulled in directions which are more or less radial of the strain relief and the strain relief is then required to yield and incline in the direction of pull to preclude sharp bending or kinking of the cord with consequent fatigue and breaking of the conductors in the cord.

In addition to yielding as aforesaid, the strain relief itself should also be inherently resistant to sharp bending and inclined instead to arch in a wide curve whereby to safeguard the ensleeved cord against the hazards aforesaid.

Accordingly it is an object of the present invention to provide an improved strain relief for an electric cord, said strain relief being capable of bending arcuately in a plurality of directions while affording support for said electric cord.

It is a further object of the invention to provide an improved strain relief of graduated flexibility throughout its length.

It is a further object of the invention to provide an improved strain relief as aforesaid which may be molded directly on to an electric cord and integrally bonded thereto.

It is a further object of the invention to provide a strain relief having the qualities enumerated above and which can readily be manufactured on a mass-production basis.

It is a further object of the invention to provide a strain relief which will offer relatively slight resistance to minor flexures of the contained cord but whose resistance to flexing will increase progressively with the sharpness of the flexure.

It is a further object of the invention to provide a strain relief as aforesaid comprised of washers arranged in series defining a sleeve fitting snugly round said cord, said washers being interconnected.

It is a further object of the invention to provide a strain relief as aforesaid wherein said washers abut each other at the bore of said sleeve and are normally spaced at their peripheries whereby the walls of said washers impinge progressively upon each other in a radial direction when the sleeve is bent producing increasingly strong resistance to sharp flexures.

It is a further object of the invention to provide a strain relief as aforesaid wherein said washers progressively decrease in breadth from one end of the sleeve to the other defining a sleeve of substantially uniform bore, but with a tapered external configuration; said sleeve being relatively more stiff at one end and becoming gradually more flexible towards its other end.

It is of course a still further object of the invention to provide an electric cord equipped with a strain relief as aforesaid.

The foregoing and other objects are achieved in accordance with the invention by the provision of a strain relief for an electric cord comprising a sleeve for said cord constituted by a series of washers assembled together in a co-axial relation; said sleeve having a bore of uniform calibre in which the cord is snugly contained so that the respective washers will move with the cord as though integrated therewith. Said washers are interconnected, of graduated diameters and thickened at their centres or hubs; the angles formed by successive pairs of washers varying progressively in degree with the angles at one end of the sleeve being markedly different relatively from those at the other end of the sleeve.

A preferred embodiment of the invention will now be described by way of illustration with reference to the accompanying drawing wherein like reference numerals designate like parts and wherein:

FIGS. 8 and 9 are perspective views of the strain relief of FIG. 1 in bent condition showing respectively the outer and inner sides of the bend, the strain relief of these figures being shown as rather longer than that of FIG. 1 for the sake of more clearly demonstrating the bending thereof;

Figure 1:
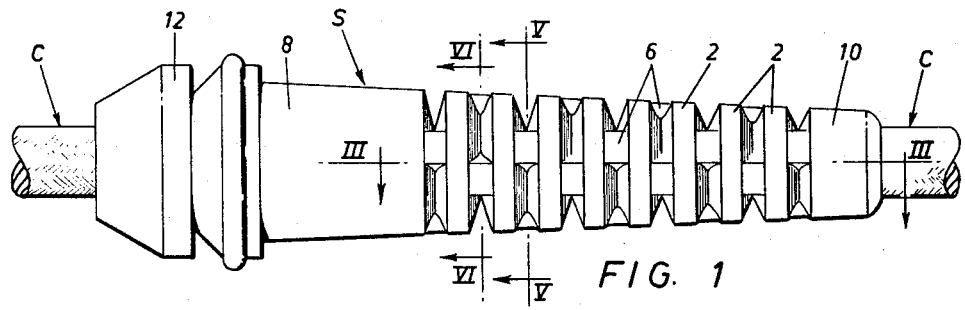
FIG. 1 is a side elevational view of a strain relief in accordance with the invention mounted on an electric cord.

A strain relief in accordance with the invention is shown in FIG. 1 in position upon an electric cord. It will be understood that the cord C is equipped with the usual conductors and is intended for attachment to an appliance although no appliance is illustrated in the drawings.

The strain relief basically comprises a sleeve S for the cord C; said sleeve being defined, in part, at least by a series of washers 2 of resilient material such as rubber. The washers 2 are arranged in co-axial relation and have central apertures which form, in combination, a central bore 4 of substantially uniform diameter or calibre in which the cord C may be tightly housed or accommodated, with the component washers 2 of sleeve S respectively gripping and co-movable with the cord to incline towards and away from each other when the cord is flexed.

In essence each washer 2 should be so snugly fitted to the cord S as to become virtually a radial flange thereof capable of being inclined by said cord responsive to every direction in which the cord may be bent or arched.

For reasons which will appear, there is a relatively material disparity between the respective diameters of the central aperture and the periphery of each washer 2, thereby providing each said washer 2 with a wall 5 of relatively substantial height between its said aperture and periphery.

The washers 2 are interconnected by spaced resilient links 6 in a manner to be described in greater detail hereinafter.

The ends of the sleeve S may comprise solid tubes 8 and 10 connected respectively to the end washer 2 of the series aforesaid by links 6; the tube 8 carrying formations 12 matable in a known manner with corresponding formations on an electric appliance for anchoring the strain relief thereto; the other end of sleeve S being free.

As shown best in FIGS. 2, 8 and 9 the washers 2 which are spaced apart at their peripheries and the relatively thin links 6 combine, in one form of the invention, to define a plurality of cells 14 which are resiliently dilatable and collapsible, as will be described, to assist in controlling the arcuate bending of the sleeve S.

Figure 5:
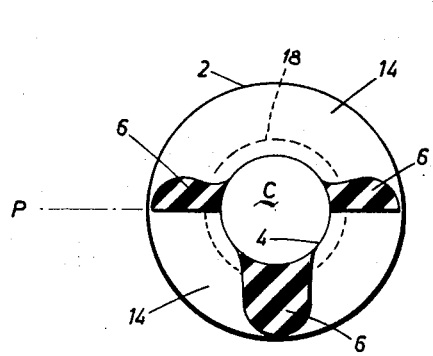
FIGS. 5 and 6 are respectively sections on the lines V—V and VI—VI of FIG. 1.
Figure 6:
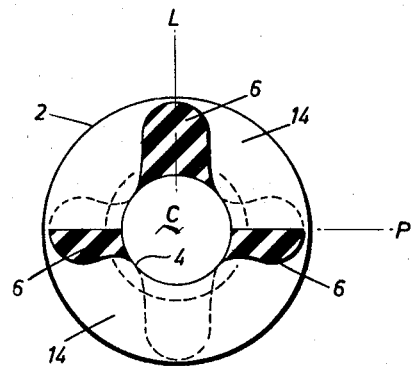

A preferred arrangement of the resilient links 6 is shown best in FIGS. 5 and 6 wherein it will be seen that each washer 2 is connected to each of its neighbours by a trio of links 6, whereof two are disposed in more or less diametrically opposed relation and the third is disposed approximately midway between said opposed links on one side of a plane P bisecting sleeve S and on an imaginary line radiating from the bore 4; said line being indicated by the letter L in FIG. 6.

As shown in FIGS. 5 and 6 each of the links 6 extends from the bore 4 substantially to the peripheries of the washers 2.

A comparison of FIGS. 5 and 6 will show that the positions of the links 6 on the respective sides of each washer are reversed with respect to each other. That is to say the third link 6 joining one pair of washers 2 is disposed on side of said plane P whereas the third link 6 joining the adjacent pair of washers 2—2 is disposed on the opposite side of the plane P.

Figure 7:
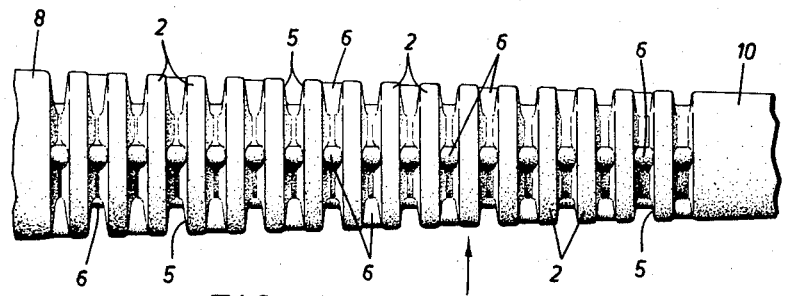
FIG. 7 is a side elevational view of a fragment of the strain relief generally similar to that of FIG. 1, but incorporating a minor structural variation.

The diametrically opposed links 6—6 joining it to its other neighbour may be disposed on the other side of said plane P as indicated in FIGS. 1, 2, 5 and 6 of the drawing. Alternately they may be linearly aligned as shown in FIG. 7 which illustrates said sleeve S in another form.

The sleeve S including the washers 2, links 6 and tubes 8 and 10 is preferably molded as a unitary structure from resilient material, and it is contemplated that the entire sleeve be molded on the cord C so that the substance of the sleeve S becomes integrated with the outer covering of the cord, as for example by permeating the woven covering 16 illustrated, strongly resisting longitudinal movement of the sleeve S relative to the cord C. Preferably the cord C is so tightly housed within the bore 4 as to integrate the washers 2 with cord C so that they will follow all bending movement of the cord.

Figure 3:
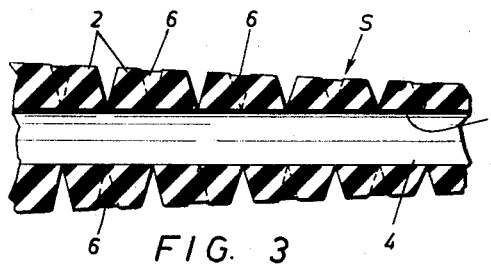
FIGS. 3 and 4 are respectively sections on the lines III—III and IV—IV of FIGS. 1 and 2, the cord being omitted for the sake of clarity.
Figure 4:
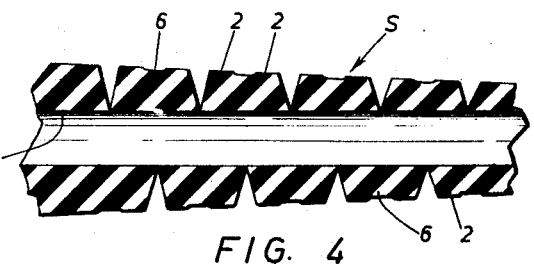

In the presently preferred embodiment each washer 2 is wedge-shaped in radial section, see FIGS. 3 and 4; the material thereof tapering from the bore 4 to the periphery of the washer. As noted above it is a feature of the invention that the washers are spaced apart at their peripheries. By reason of the aforementioned wedge-shaping, however, it is possible for the washers 2 to abut each other at the bore 4 as shown in FIG. 3, while maintaining their spaced relation at their peripheries. If the washers 2 do abut they may be united adjacent to the bore 4 by a web 18. Said web 18, indicated in broken lines in FIG. 5, should be very thin since it should have no effect on the flexing of sleeve S. Alternately some or all of the washers 2 may be disconnected and/or spaced from each other slightly at the bore 4 and in this case the cord C may be visible at the inner end of the cells 14. In the latter case the washers are more free except for links 6 to move relative to each other and to render the sleeve readily maneuverable in all directions as may well be required when the present strain relief is anchored to a movable appliance such as a domestic electric iron.

Figure 2:
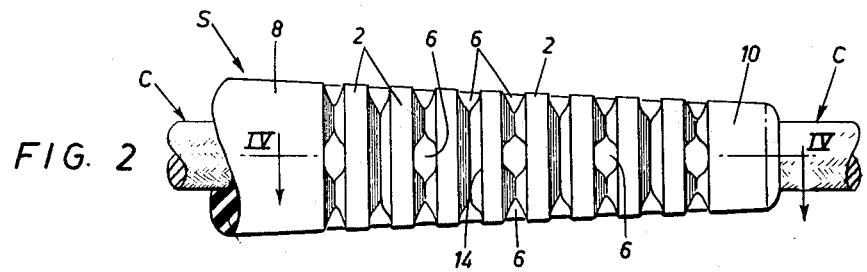
FIG. 2 is a top plan view of a part of the strain relief shown in FIG. 1, the strain relief having been rotated through 90 degrees from the FIG. 1 position.

From the foregoing it will readily be understood that in the present embodiment the links 6 are also generally wedge-shaped to complement the washer 2; said wedge-shaping being illustrated in FIGS. 1–3.

As previously mentioned, it is desirable that the flexibility of the strain relief be graduated and as one expedient to this end the sleeve S is tapered with the formations 12 being disposed at the broad end thereof from which the washers 2 progressively decrease in breadth to the other or free end thereof adjacent to the tube 10 and careful scrutiny of the drawing will reveal that the washers 2 are uniformly spaced apart at their peripheries whereby the angles between adjacent washer walls 5 at the broadened end of sleeve S are smaller in degree than those at the free end of the sleeve S.

The assembled strain relief and cord are shown in straight, unstressed condition in FIG. 1 and in an exemplary bent and stressed condition in FIGS. 8 and 9. When the sleeve S is bent the cells 14 on the "inner" or small radius side of the bend collapse resiliently (see FIG. 9) while the cells 14 on the outside of the bend dilate (see FIG. 8), the reversed relationship of the links 6 on opposite sides of each washer 2 allowing the desired degree of flexibility in the sleeve S while preventing excessively sharp or angular bending thereof.

It is noteworthy that, owing to the previously described wedge-shaping of the washer 2, confronting walls 5—5 of adjacent washers diverge from each other in the normal unstressed condition of the sleeve S but, as the sleeve S is arched, said confronting walls 5—5 on the inner curvature of the bend incline towards each other and come into progressive radial abutment with each other whereby the resistance of the sleeve to bending is progressively increased as the bend becomes sharper.

In use the cord C is electrically connected to an appliance and the sleeve S may be anchored to the appliance by means of the formations 12. Any bending strains on the cord C in the region housed in the sleeve S such as may be caused by movement of the appliance are relieved by said sleeve which flexes to permit only smooth arcuate bending of the cord and prevents sharp angular bending which could induce premature destruction of the cord.

Certain of the features of the instant strain relief are deemed to merit special comment.

For example, it is considered important that the several washers 2 be tightly fitted to the cord C so as to retain a fixed orientation therewith. Thereby arching of the cord with the sleeve S will cause the washers to incline towards each other on the concave side of the arch and to spread apart on its convex side in a known manner.

The angles contained between the washer walls 5 at the broad end of sleeve S being more acute, they will be much more easily collapsible than those contained at the free end of sleeve S when the said washer walls 5—5 are brought into abutment with each other by the arching of the sleeve.

The said washers 2 being interconnected as by links 6, when and as each pair of washer walls 5—5 abut each other, they will resist further arching of the sleeve at the same site and the arching stresses will then be communicated through said links 6 to procure abutment of the next pair of washer walls 5—5.

Owing to their reduced diameter the smaller washers 2 at the free end of sleeve S will offer increased resistance to abutment and to the arching of sleeve S.

In sum, the sleeve S will therefore yield to bending or arching pressures relatively readily at its broad end. As the bending continues and the effects of the bending forces shift progressively towards the free end of sleeve S, they will encounter increasingly greater resistance and will generally react in the manner suggested by FIG. 10 wherein are shown the forms successively assumed by the sleeve S as it is being arched.

Figure 10:
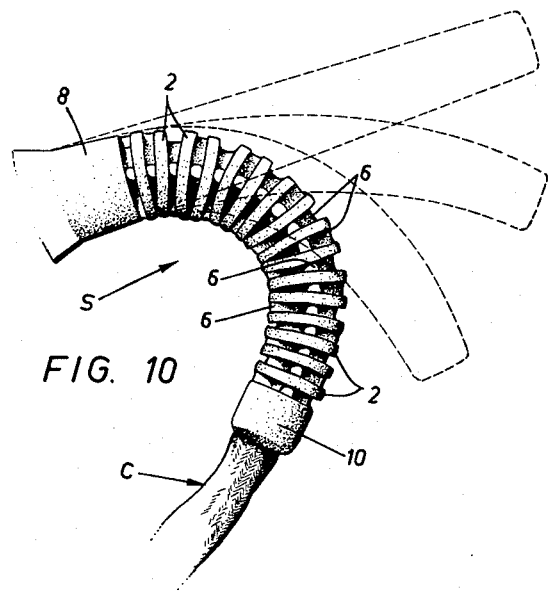
FIG. 10 is an enlarged elevational view of a fragment of the strain relief of FIG. 1 with broken lines illustrating progressive changes therein during bending.

As will be apparent from said FIG. 10, a force tending inherently to kink the cord C is thus effectively distributed along the length of sleeve S to form a curve of progressively increasing radius which will have very little deleterious effect on the cord C.

Figure 11:
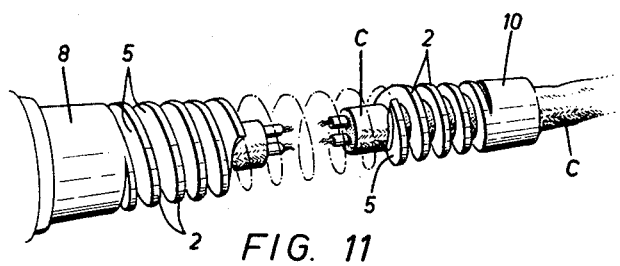
FIG. 11 is an isometric view of a modified form of strain relief embodying the principles of the present invention.

As an alternative to the present sleeve construction employing links 6 to interconnect the washers 2, the said washers 2 may be constituted by the respective coils of a spiral fin as shown in FIG. 11. In this case, the serial interconnection of the said washers will also procure their deformation to increase the resistance of the sleeve S to arching; the smaller washer 2 at the free end of sleeve S being also characterized by still further enhanced resistance to deformation and, hence, to the arching of sleeve S.

I claim:

1. The combination of an electric cord and a strain relief therefor comprising:
   a series of washers assembled on said cord in closely spaced co-axial relation, said assembled washers together forming a sleeve disposed about said cord;
   each said washer including a central aperture, said aperture of each washer in said series being tightly engaged upon said cord whereby each said washer constitutes a radial flange of said cord movable by and with it;
   resilient interconnecting means between adjacent washers located radially outwardly of said cord for transmitting and distributing local stresses throughout the length of said sleeve upon flexing of said cord;
   the radial widths of said washer flanges decreasing from one end of the sleeve to the other and each washer flange being deformable out of its radial plane upon said flexing of said cord;
   the washer flanges of relatively small radial width being more resistant to such deformation than the washer flanges of relatively greater radial width.

2. A strain relief as set forth in claim 1 wherein:
   each of said washers tapers from its aperture to its periphery in radial section, defining walls which respectively diverge from the confronting walls of the neighboring washers; the confronting walls of a pair of washers tending to progressive radial abutment when said washers are being inclined towards each other thus offering progressively increasing resistance to stresses inclining said washers towards each other.

3. A strain relief as set forth in claim 1; wherein said interconnecting means comprises a plurality of narrow, circumferentially spaced, links interconnecting each said washer to each of its neighboring washings; said washers being formed of thin resilient material rendering them resiliently deformable between said links in response to stresses inclining said washers to each other.

4. A strain relief as set forth in claim 1 wherein:
   said washers are formed of thin resilient material rendering them resiliently deformable between their interconnections in response to stresses inclining said washers relative to each other.

5. A strain relief as set forth in claim 4 wherein:
   said washers vary progressively in breadth from one end of the sleeve to the other producing tapering of said sleeve from a relatively broad end composed of wider washers to a narrow end composed of narrower washers;
   the washers at the narrow end of the sleeve being more resistant to deformation between their interconnections than those at the broad end with a corresponding graduation in the flexibility of the sleeve.

6. A strain relief as set forth in claim 4; wherein the interconnecting means is constituted by a plurality of narrow, radially spaced links.

7. A strain relief as set forth in claim 1 wherein; each of said washers tapers from its aperture to its periphery in radial section, defining walls which respectively diverge from the walls of the neighboring washers, neighboring washers abutting each other adjacent their apertures; the walls of a pair of neighboring washings tending to progressive radial abutment when said washers are being inclined towards each other thus offering progressively increasing resistance to stresses inclining said washers towards each other, the washers in said series being uniformly spaced apart with the angles formed by the diverging walls of the washers at the broad end of the sleeve being more acute than at its narrow end.

8. A strain relief as set forth in claim 1 wherein said interconnecting means comprises a plurality of narrow, circumferentially spaced links interconnecting each said washer to each of its neighboring washers; said washers being formed of thin resilient material rendering them resiliently deformable between said links in response to stresses inclining said washers to each other; said washers in said series being uniformly spaced apart and each of said washers tapering from its aperture to its periphery in radial section, defining walls which respectively diverge from the walls of the neighboring washers, neighboring washers abutting each other adjacent their apertures; the angles formed by the diverging walls of the washers at the broad end of the sleeve being more acute than at the narrow end.

References Cited

UNITED STATES PATENTS

| 2,727,088 | 12/1955 | Lawall | 174—135 |
| 3,032,737 | 5/1962 | Rottmann | 339—101 |
| 3,093,432 | 6/1963 | King | 339—101 X |

FOREIGN PATENTS

| 1,360,801 | 4/1964 | France. |

LARAMIE E. ASKIN, *Primary Examiner.*